US011910477B2

(12) United States Patent
Lamberton et al.

(10) Patent No.: US 11,910,477 B2
(45) Date of Patent: *Feb. 20, 2024

(54) METHOD FOR OPERATING A SERVER WITH USER EQUIPMENT IN A CELLULAR NETWORK

(71) Applicant: THALES DIS FRANCE SAS, Meudon (FR)

(72) Inventors: Marc Lamberton, Antibes (FR); Michel Anslot, Mougins (FR)

(73) Assignee: THALES DIS FRANCE SAS, Meudon (FR)

( * ) Notice: Subject to any disclaimer, the term of this patent is extended or adjusted under 35 U.S.C. 154(b) by 0 days.

This patent is subject to a terminal disclaimer.

(21) Appl. No.: 17/683,489

(22) Filed: Mar. 1, 2022

(65) Prior Publication Data
US 2022/0369093 A1 Nov. 17, 2022

Related U.S. Application Data

(63) Continuation of application No. 16/971,819, filed as application No. PCT/EP2019/054045 on Feb. 19, 2019, now Pat. No. 11,323,870.

(30) Foreign Application Priority Data

Feb. 23, 2018 (EP) ..................................... 18305191

(51) Int. Cl.
*H04W 8/06* (2009.01)
*H04W 8/12* (2009.01)
(Continued)

(52) U.S. Cl.
CPC ........... *H04W 8/12* (2013.01); *H04L 63/0853* (2013.01); *H04W 8/06* (2013.01); *H04W 8/20* (2013.01); *H04W 12/06* (2013.01)

(58) Field of Classification Search
CPC ....................................................... H04W 8/12
See application file for complete search history.

(56) References Cited

U.S. PATENT DOCUMENTS 9,629,475 B2   4/2017   Veron
10,681,072 B2   6/2020   Alfano et al.
(Continued)

OTHER PUBLICATIONS

3rd Generation Partnership Project; Technical Specification Group Services and System Aspects; 3G Security; Security architecture (Release 14), France, vol. SA WG3, No. V14.1.0, Mar. 16, 2017, pp. 1-77.

(Continued)

*Primary Examiner* — Michael T Vu

(57) ABSTRACT

A central server for communicating with a user equipment and a cellular network is provided. The server is configured to exchange with the cellular network information relating to at least one preconfigured qualifier assigned to the user equipment and assigned to the central server. The server receives a payload item from the cellular network transmitted by the user equipment to said cellular network by means of an authentication failure message for authenticating a user equipment at a cellular network during an attach comprising the payload item, instead of receiving a SMS or establishing an IP connection with the user equipment. The payload item can result from a latest measurement data of user equipment regularly transmitting data to said central server and/or a sensor connectively coupled to the user equipment when operating as an Internet of Things (IoT) smart-metering device.

14 Claims, 3 Drawing Sheets

(51) Int. Cl.
*H04L 9/40* (2022.01)
*H04W 8/20* (2009.01)
*H04W 12/06* (2021.01)

(56) References Cited

U.S. PATENT DOCUMENTS

| | | |
|---|---|---|
| 10,943,005 B2 | 3/2021 | Chen |
| 2013/0080782 A1 | 3/2013 | Rajadurai et al. |
| 2017/0187831 A1* | 6/2017 | Otting ................ H04W 12/041 |
| 2019/0021121 A1* | 1/2019 | Aravamudhan ...... H04W 28/22 |
| 2019/0132347 A1* | 5/2019 | Wakid .................... H04L 1/203 |

OTHER PUBLICATIONS

3rd Generation Partnership Project; Technical Specification Group Services and System Aspects; General Packet Radio Service (GPRS); Service description; Stage 2 (Release 15), France, vol. Sa WG2, No. V15.1.0, Dec. 22, 2017, pp. 1-367.

International Search Report (PCT/ISA/210) and Written Opinion (PCT/ISA/237) dated Apr. 4, 2019, by the European Patent Office as the International Searching Authority for International Application No. PCT/EP2019/054045.

Written Opinion (PCT/ISA/237) dated Apr. 4, 2019, by the European Patent Office as the International Searching Authority for International Application No. PCT/EP2019/054045.

* cited by examiner

METHOD FOR OPERATING A SERVER WITH USER EQUIPMENT IN A CELLULAR NETWORK

FIELD OF THE INVENTION

The present invention relates to a user equipment for wireless communication.

The invention also pertains to a cellular network for wireless communication.

The invention further relates to a central server for communicating with a user equipment.

The invention also pertains to method for a user equipment to operate in a cellular network. The invention also relates to a method for a cellular network to serve a user equipment.

BACKGROUND OF THE INVENTION

According to the Recommendation ITU-T Y.2060 provided by the Inter-national Telecommunication institute, the Internet of things (IoT) is defined as a global infrastructure for the information society, enabling advanced services by interconnecting physical and virtual things based on existing and evolving interoperable information and communication technologies. A thing is an object of the physical world (physical things) or the information world (virtual things), which is capable of being identified and integrated into communication networks. At present, IoT is generally applied in fields such as security surveillance, automatic vending machines, public traffic systems, vehicle monitoring and management, industry process automatization, motor machineries, city information, smart metering and smart homes.

Such IoT devices, or more general user equipments, are equipped with communication capabilities for operating with other communication partners, mainly by means of wireless communication. In particular cellular networks are well suited to serve such user equipments for IoT purposes due to its wide availability and comparably high reliability.

The cellular networks are preferably configured to support cellular technology standards like 2G (GSM, GPRS, EDGE), 3G (UMTS, HSDPA), 4G (LTE) and 5G (new radio). In particular the recent releases of the technology standards are supportive of the so-called Machine Type Communication (MTC) resp. Machine to Machine (M2M) devices. Such devices provide a different behavior than regular mobile handsets, in particular in terms of amount of data to be transmitted, frequency and occurrences of data transmissions. User equipments like smart meters deliver e.g. once a day or once a week a small amount of data to a central server of the company operating the smart meter, and then are silent again for 24 h or 7 days.

A regular subscription like for a mobile handset and data transmission charging e.g. per SMS would make such a business model not feasible for the company operating such devices.

Another difference to mobile handsets is, that it is not known in which country a user equipment will be operated. Hence the preconfiguration of the user equipment, in particular with regards to the SIM-card resp. UICC is not possible. This issue is all the more the case with an embedded UICC, solderable SIM (MIM) or softSIM. This might lead to the situation that the user equipment is operating in a cellular network, which is not the home cellular network, and where the roaming agreements are very disadvantageous, due to the fact that the user equipment has not all information available for selecting a visited cellular network with costwise better roaming conditions.

Hence it requires improvements for the presently available user equipments and cellular networks for achieving an in particular cost optimized way of operation in order to build a foundation to make such business models economical feasible. It is therefore the goal of present invention to overcome the mentioned disadvantages and to propose a solution for an user equipment operating in a cellular network.

Further alternative and advantageous solutions would, accordingly, be desirable in the art.

SUMMARY OF THE INVENTION

For this it is according to a first aspect of the invention suggested a user equipment according to claim 1. According to a second aspect of the invention it is proposed a cellular network according to claim 7. In a third aspect of the invention it is suggested a central server according to claim 11. In a fourth aspect of the invention it is proposed a method for operating a user equipment according to claim 14. According to a fifth aspect of the invention it is suggested a method for a cellular network according to claim 16.

In a first aspect of the invention it is proposed a user equipment for wireless communication, configured to operate in a cellular network, the user equipment comprising a credential container, configured to be embedded into the user equipment, the user equipment is configured to send a set of payload items to a central server communicatively coupled to the cellular network, wherein for sending at least one of said payload items the user equipment is configured to send an attach request message to the cellular network comprising a preconfigured qualifier for at least one of the user equipment and the credential container, further the user equipment is configured:

to retrieve an authentication request message from the cellular network comprising a random value and an authentication code, to determine a response token comprising a preconfigured identifier stored in at least one of the user equipment and the credential container and at least one out of the set of payload items, to submit said response token with an authentication failure message to the cellular network for forwarding to the central server.

The respective user equipment is in particular an IoT-device, configured for operating in a cellular network according to the wireless technology standards 2G, 3G, 4G and beyond, including its variants like Cat-M, NB-IoT etc. Other standards may also be encompassed.

Hence the user equipment is equipped with at least one communication unit, preferably connected to an antenna, said communication unit comprising transmitting circuitry and receiving circuitry—respectively a transceiver—for communication with base stations of the cellular network it is supposed to operate with. Further the user equipment comprises processing circuitry for controlling the transmitting and receiving circuitry, in order to comply with said technology standard protocols. Preferably the user equipment is further equipped with memory circuitry for storing software files, configuration data etc.

The user equipment further comprises a credential container. Said credential container is configured to store securely credentials for authenticating at the respective cellular networks. Preferably the credential container is a SIM-card, a UICC, an eUICC, a solderable SIM, or a softSIM, e.g. in connection with a secure element.

In one embodiment the credential container does not comprise a full subscription, but has only limited access to its home cellular network.

In the case of an IoT device or similar devices the user equipment further has preferably an application processor which controls via a command interface the communication unit. The application processor is preferably controlling further the operation of the IoT device, like making measurements, maintaining a user equipment, collecting data or connecting to other communication means, e.g. wired or by means of other wireless technologies like WiFi, Wimax, Bluetooth, NFC, Lorawan or the like.

For the inventive user equipment the mentioned components are configured to fulfill the assigned tasks, whereby some components have more active roles than others. Some tasks may be carried out in the application processor, the communication unit, the credential container or the transmit/receipt circuitry.

The user equipment has the task to provide a set if payload items to a central server, in particular assigned by a service provider. Said central server is communicatively coupled to a cellular network, preferably the home cellular network. Preferably it is connected by means of the Packet Data Network Gateway (PDN-GW) via internet to the cellular network, that means it as reachable by a common web address resp. IP-address. Therefore preferably a directory or discovery component is available in the cellular network to assure that requests as part of the inventive solution arrive at the central server, in this case.

The central server may optionally be part of the cellular network, and provide an interface for the service provider.

Such payload item is in particular the result of a measurement, e.g. the consumed electricity of the last 24 hours, in case of a metering device, or by any other sensor connectively coupled to the user equipment. Also an alert message, e.g. as part of a theft protection system, may be transmitted.

This means the payload is preferably in the range of only a few bytes.

The user equipment has the task to send such payload data to the central server by means of the cellular network it is currently camping in. The payload is the measured data, the central server is interested in for further processing.

Instead of sending a SMS or establishing an IP connection for exchanging IP packages comprising the payload data, according to the invention, the user equipment makes use of messages which are known in the respective technology standards for authenticating a user equipment at a cellular network during the attach process.

This attach process is preferably started by the user equipment with an attach request message. For doing so the user equipment resp. its communication unit needs to have identified a base station of a cellular network in proximity of the user equipment with sufficient signal strength in order to be able to establish a stable wireless link. Such a base station is depending upon the supported technology standard of the cellular network a base station (BS), a NodeB, an eNodeB etc.

When the user equipment is synchronized on the base station it is configured to send the attach request message to the base station.

A parameter of the attach request message is a preconfigured qualifier. This preconfigured qualifier is stored preferably in the credential container, alternatively in the memory circuitry of the user equipment.

The preconfigured qualifier is indicative of the subscription of the user equipment. One option is that it is a permanent identifier like a IMSI or MSISDN.

According to a preferred embodiment the preconfigured qualifier used for the attach request message is an ephemeral IMSI.

In this case the credential container issued by the cellular network operator resp. the service provider has stored a range of IMSIs. The user equipment choses by random one out of the range of IMSIs and submits it with the attach request. For the case of a roaming user equipment this helps the visited cellular network to identify the home cellular network and route the attach request message to the respective home cellular network.

The user equipment is after submission of the attach request configured to receive an authentication request message from the cellular network. This authentication request message typically comprises a random value and an authentication code, and preferably a command. Typically the authentication code (or authentication token AUTN) is used for identifying the cellular network. When receiving the authentication request message the user equipment resp. the credential container handles this authentication challenge. This is originally envisaged for submitting a defined answer and so retrieve the approval from the cellular network to attach the user equipment.

However the inventive user equipment instead determines a response token comprising the one or more payload items to be transmitted and preferably a preconfigured identifier. This determination procedure is preferably carried out by the credential container, which retrieves the one or more payload items from the user equipment.

Said preconfigured identifier is for uniquely identifying the user equipment, either on the side of the (home) network or the central server. Hence it is either stored in the memory of the user equipment or the credential container. In the latter case a permanent IMSI would be appropriate, or an ICCID or a MSISDN, in the former case the IMEI, or any other ID preconfigured by the service provider. In a preferred embodiment the preconfigured identifier is the preconfigured qualifier used for the attach message.

The normal response to the authentication request message from the cellular network is the authentication answer.

However in case of e.g. an synchronization failure the user equipment may also send an authentication failure message, indicating that something went wrong. With such authentication failure message the response token with the payload data is transmitted from the user equipment to the cellular network.

The authentication failure message offers according to present technology standards 14 bytes for submitting the response token.

When the cellular network is configured to forward the response token to the central server—either direct or indirect via another cellular network—then the payload is consequently submitted although no full connection between the user equipment is established.

The inventive solution hence allows a submission of a few bytes of data—which is a typical use case in the field of IoT devices—without actually establishing a connection and causing transmission costs. This is all the more possible without changing the technology standards and works at least for 3G and 4G compliant user equipments.

This procedure is in particular preferable for a user equipment with temporary credentials, e.g. not yet fully provisioned.

Also the service provider may save permanent IMSIs when a huge amount of user equipments, e.g. smart metering devices are installed in a region, then not every single user equipment needs a separate full subscription. With the option of the ephemeral IMSI this inventive solution gets even more advantageous and achieves the envisaged goal.

According to a preferred embodiment the user equipment is further configured to receive a second authentication request message from the cellular network in response to said authentication failure message, said second authentication request message comprising at least a response data item.

With this embodiment it is introduced that the user equipment also may receive a payload message from the cellular network, in particular in fact triggered by the central server.

This embodiment perpetuates the approach by using already defined messages from the attach procedure. In response to the authentication failure message mentioned before the cellular network would be able to send another authentication request message. Such authentication request message may also—besides the parameter mentioned before—transport another response data item, where payload data are contained according to this embodiment. This happens preferably as part of the AUTS parameter.

The user equipment according to this embodiment is consequently configured to receive such second authentication request message and process the contained response data item, in particular in conjunction with the credential container One option of response data item is to provide an acknowledgment message from the central server. So the user equipment is assured that its data transmission was successful and can consequently discard the transmitted measurements or any other payload.

Another option for the response data item is to provide a command or any other information for the user equipment from the central server. With such command the central server may instruct the user equipment about future data transmissions, e.g. at another—less congested—time, another frequency of occurrence, instruct to reselect to another base station or even in another cellular network.

It is preferable in the context of IoT devices to provide imminent instructions or other information from the central server to the IoT device, once it sends its regular data transmission. In particular for IoT devices operating e.g. only once a day, it is preferable to go into a sleep mode, where even incoming calls are not paged. Such modes are known as Power Saving Mode (PSM) in LTE. The preferred embodiment may hence optimally be combined with such measures.

In response to the second authentication request message the user equipment preferably reply with an authentication answer message comprising in appropriate data. Consequently the cellular network rejects the attach procedure. This rejection is preferably made known to the user equipment by the predefined attach reject message. The user equipment may consequently detach and preferably wake up the next time its data transmission timer has expired.

It is shown, that the inventive user equipment is able to exchange data in direction to the central server and in the opposite direction by standard-compliant messages between user equipment and cellular network, without causing data transmission costs and also for the cellular network no big signalling overhead for setting up a data connection.

With the re-use of standard messages also a deployment of the method is easily achieved.

According to another preferred embodiment it is further suggested for the user equipment, that the credential container is issued by a home cellular network, and the cellular network the user equipment is currently operating in, hereinafter the visited cellular network, is a different cellular network than the home cellular network, the home cellular network and the visited cellular network being communicatively connected, and said authentication request message is initiated by the home cellular network and received through the visited cellular network, wherein the central server is connected with the home cellular network.

This embodiment suggests that the described procedure is also operative for a user equipment roaming in a visited cellular network. The visited cellular network is according to the technology standards configured to exchange the mentioned messages with the user equipment and to forward to the home cellular network. Hence, a central server connected to the home cellular network—or being part thereof—is fully sufficient for an inventive user equipment to operate.

In the home cellular network the received message is preferably exchanged with the central server. The response data item provided by the central server is returned by the home cellular network to the visited cellular network which gets by this way instructed to transmit the response data item with the second authentication request message.

Due to the fact that no actual payload data are transmitted, in terms of data transmissions accountable by the visited cellular network, at least for the purpose of regular data transmission, the envisaged method works anywhere in the world when the home cellular network supports this method, without additional costs.

However, the user equipment may be configured to exchange other data with the home cellular network resp. the central server, in particular when larger data amounts are necessary. This might relate to software or configuration updates or anything else which is not possible to be transmitted with the few bytes as mentioned above.

Hence it is suggested according to another preferred embodiment that the credential container further comprising a list of preferred visited cellular networks, wherein in response to said attach request said authentication request message received through the visited cellular network comprises at least one preferred network data item, wherein the preferred network data item is received at the visited cellular network from ascertained by the home cellular network, and the user equipment is further configured to instruct the credential container to update the list of preferred visited cellular networks with said preferred network data item.

Said user equipment is operating in a visited cellular network. It is known that common credential containers contain a list of preferred cellular networks (also known as "PLMN list"). This indicates for a user equipment switched on in a country where the home cellular network is not available, with which of the available cellular networks the most preferable roaming agreements are in place, which means the lowest costs for the subscription owner.

When the list of preferred cellular networks does not comprise an entry for a certain country, the user equipment is currently located in, the user equipment will probably try to camp on any cellular network, e.g. the one with the base station with the best signal strength at the time of switching on.

When the user equipment then sends the attach message, the visited cellular network will forward it again to the home cellular network—regardless of the roaming agreement. The home cellular network may detect that a disadvantageous visited cellular network was selected by the user equipment, or at least that no entry in the list of preferred cellular networks is available for the country of the visited cellular network. An update of the preferred cellular network list would however require another data connection with costly transmission of SMS or IP data packets, in particular as part of an Over-the-Air (OTA) update procedure.

According to the preferred embodiment however the user equipment is configured to retrieve in response to the attach message an authentication request message from the visited cellular network—but initiated through the home cellular network—where in the mentioned data field of the authentication request message at least one preferred network data item is submitted.

Preferably the attach message comprises again a predefined qualifier, in particular a permanent IMSI assigned to the credential container, resp. an identifier assigned to the user equipment.

The user equipment is configured to instruct in response to the reception and evaluation of the authentication request message the credential container to update the stored list of preferred visited cellular networks with the received preferred network data item.

Advantageously the preferred network data item comprises one indication for a preferred cellular network for the country the user equipment is currently operating in. Preferably the preferred network data item comprises coded or direct at least the Mobile Network Code (MNC) of the cellular network with the best roaming agreement with the home cellular network.

Optionally said message exchange for updating the list of preferred visited cellular network is carried out independently of data transmissions through the attach/authentication message/authentication failure message data flow described before.

Preferably it is suggested according to another advantageous embodiment that in response to updating the list of preferred visited cellular networks the user equipment is configured to determine if the visited cellular network the user equipment is currently operating in is represented in the list of preferred visited cellular networks, if this is not the case the user equipment is configured to detach from said visited cellular network when a third cellular network being represented in the list of preferred cellular networks is available for attach.

According to this embodiment the user equipment then checks if the cellular network it is currently camping on is listed in the preferred visited cellular network list. If not, consequently the user equipment detaches from the current cellular network and tries to attach to the third cellular network now indicated in the preferred network list stored in the credential container.

After that with the next attach request to the third cellular network the user equipment may start another data transmission session as described before.

Preferably the user equipment is configured to receive in response to an attach request such an authentication request message for updating the list of preferred cellular networks independent of the payload transmission mentioned before. This means the user equipment may send an attach request, e.g. right after first synchronizing on a base station of the visited cellular network. In case it gets a PLMN list update indication with the authentication request message from the cellular network, it carries out the update and if necessary detaches from the visited cellular network.

Then after attaching to the third cellular network, the user equipment may operate normally in the third cellular network, e.g. for making a bigger data transmission regularly by setting up a data connection.

Alternatively the message exchange is carried out after resp. in conjunction with a couple of data transmissions through the attach/authentication message/authentication failure message data flow described before.

This shows, that this embodiment is moreover advantageous as it allows for an IoT device to improve the cost awareness in particular when operating in a country different from the home cellular network's country. With this embodiment even the update of the list of preferred cellular networks will cause no additional costs for the subscription owner. Moreover the visited cellular network has no possibility to avoid such signalling between the home cellular network and the user equipment.

According to the second aspect of the invention it is suggested a cellular network for wireless communication, configured to serve at least one user equipment, the cellular network being communicatively coupled to a central server, wherein the cellular network is further configured:

- to receive an attach request message from said user equipment, wherein the attach request message comprises a preconfigured qualifier for at least one of the user equipment and a credential container coupled to the user equipment,
- to determine an authentication vector comprising a random value and an authentication code,
- to submit an authentication request message comprising said authentication vector to the user equipment,
- to retrieve in response an authentication failure message from the user equipment,
- to determine if said authentication failure message comprises a response token comprising a preconfigured identifier and at least one payload item,
- to evaluate if said preconfigured identifier is assigned to said central server,
- and if so, to send the at least one payload item to the central server.

Said inventive cellular network is a network for wireless communication in particular according to the mentioned technology standards 3G, 4G and beyond. The cellular network comprises a couple of components, in particular base stations resp. NodeB and eNodeBs as a direct interface to the user equipments operating in the cellular networks. Such base stations provide transmitting and receiving circuitry and at least one antenna for wireless signalling. Further processing circuitry and memory circuitry are preferably incorporated in a base station of the inventive cellular network.

Further the cellular network comprises a couple of internal components assigned for different tasks. In dependence of the technology standards such components have different tasks and different naming. Typical for 4G (LTE) is the Mobility Management Entity (MME) which controls the base stations. Further a Home Subscriber Server (HSS) is a component which is assigned to check the status of subscription of camping base stations. Through the PDN-GW a connection to the internet is established. In 3G the base stations (NodeB) are managed by the RNCs, which are connected to the SGSN resp. MSC. The Home Location Register (HLR) maintains the subscription status of subscribes, the Visitor Location Register (VLR) maintains subscriptions of visiting subscribers of other cellular networks.

In 5G the network topology might change, in particular in regards to the slice-concept. However for the first releases (Non-Stand-alone), 5G will re-use the 4G network components.

For simplicity reasons in the following the components known for 4G are named, without limiting to 4G only.

The inventive cellular network is further communicatively coupled to a central server. Preferably such central server is assigned to a service provider, and handles requests from user equipments put into the field from the service provider.

The inventive cellular network is configured to receive an attach request message from a camping user equipment and interprets this as start of the attach procedure. The submitted preconfigured qualifier is handled accordingly, e.g. with checking in the HSS.

Consequently the cellular network is configured to respond with an authentication request message, wherein the authentication vector from random value and authentication code is provided. This is typically controlled by the HSS, sending a Authentication Info Request (AIR) message to the MME, comprising the respective parameter.

The AIR message is part of the DIAMETER protocol. The answer to an AIR message is therein defined as Authentication Information Answer (AIA). For 3G the Mobile Application Part (MAP) protocol, where Send Authentication Information (SAI) request and response are exchanged. In the following again for simplicity reasons the 4G terminology is used, without limiting the scope of the invention to 4G.

The cellular network, in particular the MME, instructs then the base station where the user equipment is currently camping on (hereinafter: the serving base station) the authentication request message.

A common cellular network expects now a authentication response, or in case of an error an authentication failure.

The inventive cellular network however in case of receiving an authentication failure either itself or by means of a connected (home) cellular network determines if said authentication failure message comprises a response token comprising a preconfigured identifier and at least one payload item.

If so, the cellular network checks with the preconfigured identifier if it is assigned to said central server.

Preferably a call interface is available for checking at the central server that the preconfigured identifier is assigned to the service provider of the central server. Alternatively the HSS or another cellular network component provides relation table between such preconfigured identifiers of a user equipment and a central server.

If the respective central server is identified, then the cellular network is configured to provide the at least one payload item to the central server for further handling.

Hence, a cellular network according to this aspect of the invention is able to detect that the user equipment provides with the authentication failure message additional payload data, and to find the central server for forwarding such provided data.

According to an additionally advantageous embodiment the cellular network is further configured to receive a response message comprising a response data item from the central server, and to submit the response data item as part of a second authentication request message to the user equipment.

With this embodiment the cellular network provides for the central server the means to provide a response to the user equipment. When the cellular network, e.g. the HSS, receives such a response of a few bytes from the coupled central server, this is forwarded by means of a second authentication request message to the user equipment. This authentication request message allows according to the technology standard to provide certain data, including random value and authentication code, plus an additional data field. Herein the response data item from the central server is provided to the user equipment.

Such response data item is preferably an acknowledgement or non-acknowledgement of the data transmission received from the user equipment.

According to another preferred embodiment it is suggested that the cellular network is further connected to a second cellular network, the cellular network further being configured to retrieve through the connection to the second cellular network an attach request message from a user equipment operating in the second cellular network, the cellular network further being configured to evaluate if said second cellular network being part of a preconfigured list of preferred visited cellular networks, if this is not the case, further configured to instruct in response to the received attach request message the second cellular network to send the authentication request message to said user equipment comprising at least one preferred network data item derived from said list of preferred visited cellular networks, wherein said preferred network data item is usable for updating a list of preferred visited cellular networks being stored in the credential container of the requesting user equipment.

This embodiment relates to a user equipment roaming in a second cellular network, the so-called visited cellular network. This is a cellular network different from the home cellular network. When the user equipment is operating in said visited cellular network, the attach request message from the user equipment is directly forwarded to the cellular network according to this aspect of the invention, the home cellular network.

Consequently the home cellular network checks if the second cellular network is part of the preconfigured list of preferred visited cellular network, stored in the credential container of the user equipment. Such a list is typically available in the cellular network and represents the roaming agreements with different cellular network providers. For a given country, e.g. indicated by the Mobile Country Code (MCC), typically one cellular network is the preferred visited cellular network. In some cases also more than one cellular network might be available.

Such information are also stored in the credential container of the user equipment, but not exhaustively for all countries in the world. Hence, when a user equipment operates in a certain country in visited cellular network A, the home cellular network might figure out that visited cellular network B is the preferred visited cellular network for this country.

In this case the cellular network initiates a message to the currently visited cellular network of the requesting user equipment instructing the visited cellular network to transmit an authentication request message to the user equipment additionally comprising a preferred network data item.

With said preferred network data item the user equipment is put into the position to update the list of preferred visited cellular networks stored in its credential container.

This embodiment is in particular foreseen to also be implemented independent of the payload data transmission. It is however advantageous to use both approaches together.

According to a preferred embodiment the cellular network is further configured that said central server being configured to store data relating to preferred visited cellular networks, and wherein the cellular network is in response to the received attach request message configured to retrieve at least one set of data relating to preferred visited cellular networks from the central server and to determine said preferred network data item from said at least one set of data relating to preferred visited cellular networks.

In this embodiment the central server stores the data relating the preferred visited cellular networks. Hence the inventive cellular network requests from the central server if a respective visited cellular network in a certain country, and if not to retrieve a set of data indicating the preferred visited cellular network, for creating the authentication request message with the preferred network data item.

Preferably the central server is part of the cellular network or at least directly assigned.

According to the third aspect of the invention it is proposed a central server for communicating with a user equipment through at least one cellular network, being communicatively coupled with said at least one cellular network, said central server being configured to exchange with said at least one cellular network information relating to at least one preconfigured qualifiers assigned to at least one user equipment being assigned to the central server, and to receive a payload item from said cellular network transmitted by said user equipment to said cellular network by means of an authentication failure message.

The inventive central server according to this embodiment is a server maintained by the service provider, e.g. the provider of smart meter etc. The central server comprises communication circuitry for accessing at least one cellular network. This is typically handled via wired connection, e.g. landline internet connections.

Further the central server comprises at least one data base or access to data base, in particular distributed. This also includes cloud based data services.

The service provider typically installed a number of user equipments in the field according to the first aspect of the invention.

The central server according to this aspect of the invention comprises service logic, which allows to retrieve from the coupled cellular network a request providing a preconfigured qualifier.

Such preconfigured qualifier is preferably provided with a credential container in the installed user equipments of the service provider. As set out before, this might be an ephemeral IMSI out of a range of IMSIs assigned to the service provider. Typically this is managed by the manufacturer of the credential container e.g. in collaboration with the service provider or the cellular network operator or both.

Hence, when an attach request of a user equipment comprises such a preconfigured qualifier, the cellular network may check with the central server by means of a call interface if said preconfigured qualifier is assigned to the central server, and consequently might start a data exchange session.

Hence the central server is then configured to receiver a payload item received from the coupled cellular network, which received this payload item with the authentication failure message from the user equipment, as set out in the first and second aspect of the invention.

According to another embodiment the central server is further configured in response to receiving said payload item, to submit a response data item to the cellular network for submitting to the user equipment by means of a second authentication request message.

This embodiment relates to the response data item provided from the central server to the user equipment. This is according to this embodiment carried out in response to receiving the payload data, to provide a response data item.

Such response data item may in particular comprise an acknowledgement of successful receipt, or an non-acknowledgement of successful receipt, in particular in order to initiate a resending from the user equipment, or a different type of data, e.g. a command etc.

The central server is configured to provide such response data item to the cellular network for submitting to the user equipment by means of the second authentication message.

According to another preferred embodiment it is proposed a central server further configured to store data relating to at least one preferred visited cellular network, and to provide at least one set of data relating to said preferred visited cellular networks to said communicatively coupled cellular network.

This embodiment relates to the update of the preferred visited cellular network list. Herein the central server serves for the cellular network as the storage base for checking which cellular network is preferred for a respective country. Hence the coupled cellular network may check with the central server if a certain visited cellular network of a user equipment is the preferred visited cellular network of the country, and if not provide an indication relating to the preferred visited cellular network to the user equipment by means of the authentication request message.

Preferably the central server according to this embodiment is part of the cellular network it serves.

According to the fourth aspect of the invention it is proposed a method for operating a user equipment for wireless communication, in a cellular network, the user equipment comprising a credential container, configured to be embedded into the user equipment, the user equipment is configured to send a set of payload items to a central server communicatively coupled to the cellular network, wherein for sending at least one of said payload items the method comprises the steps of:
  sending an attach request message to the cellular network comprising a preconfigured qualifier for at least one of the user equipment and the credential container,
  retrieving an authentication request message from the cellular network comprising a random value and an authentication code,
  determining a response token comprising a preconfigured identifier stored in at least one of the user equipment and the credential container and at least one out of the set of payload items,
  submitting said response token with an authentication failure message to the cellular network for forwarding to the central server.

The method shares the advantages of the first aspect of the invention.

According to the fifth aspect of the invention it is suggested a method for a cellular network for wireless communication, configured to serve at least one user equipment, the cellular network being communicatively coupled to a central server, the method comprising the steps of:
  receiving an attach request message from said user equipment, wherein the attach request message comprises a preconfigured qualifier for at least one of the user equipment and a credential container coupled to the user equipment,
  determining an authentication vector comprising a random value and an authentication code,
  submitting an authentication request message comprising said authentication vector to the user equipment,
  retrieving in response an authentication failure message from the user equipment,
  determining if said authentication failure message comprises a response token comprising a preconfigured identifier and at least one payload item, evaluating if said preconfigured identifier is assigned to said central server, and if so, to send the at least one payload item to the central server.

The method shares the advantages of the second aspect of the invention.

It is hence shown, that with an cellular network according to the second aspect of the invention the data transmission between the user equipment according to the first aspect of the invention and the central server according to the third aspect of the invention is possible by means of standard messages used for the attach procedure, but without charged data transmissions. Hence the envisaged goal of the invention is achieved to provide cost optimized data transmission means in the local and the international context.

BRIEF DESCRIPTION OF THE DRAWINGS

The following description and the annexed drawings set forth in detail certain illustrative aspects and are indicative of but a few of the various ways in which the principles of the embodiments may be employed. Characteristics and advantages of the present invention will appear when reading the following description and annexed drawings of advantageous embodiments given as illustrative but not restrictive examples.

FIG. 1 shows a sequence diagram of the message flow of an exemplifying embodiment of the invention. It shows the user equipment 1, in operating relation with a cellular network 2, here represented by the Mobility Management Entity (MME) 3 and a Home Subscriber Server (HSS) 4. The MME 3 includes the base station the user equipment 1 is directly connected with. The respective exemplifying cellular network is implementing the 4G/LTE technology standard, hence the terminology is used for the network components and messaging. For 3G the used functionality is available as well, but with other components and messaging. For 5G it is expected in the beginning to reuse these components, and later to define a specific network architecture. The basic functionality will anyhow be present as well, and therefore the invention is also applicable to 5G as well as 3G.

Figure 1:
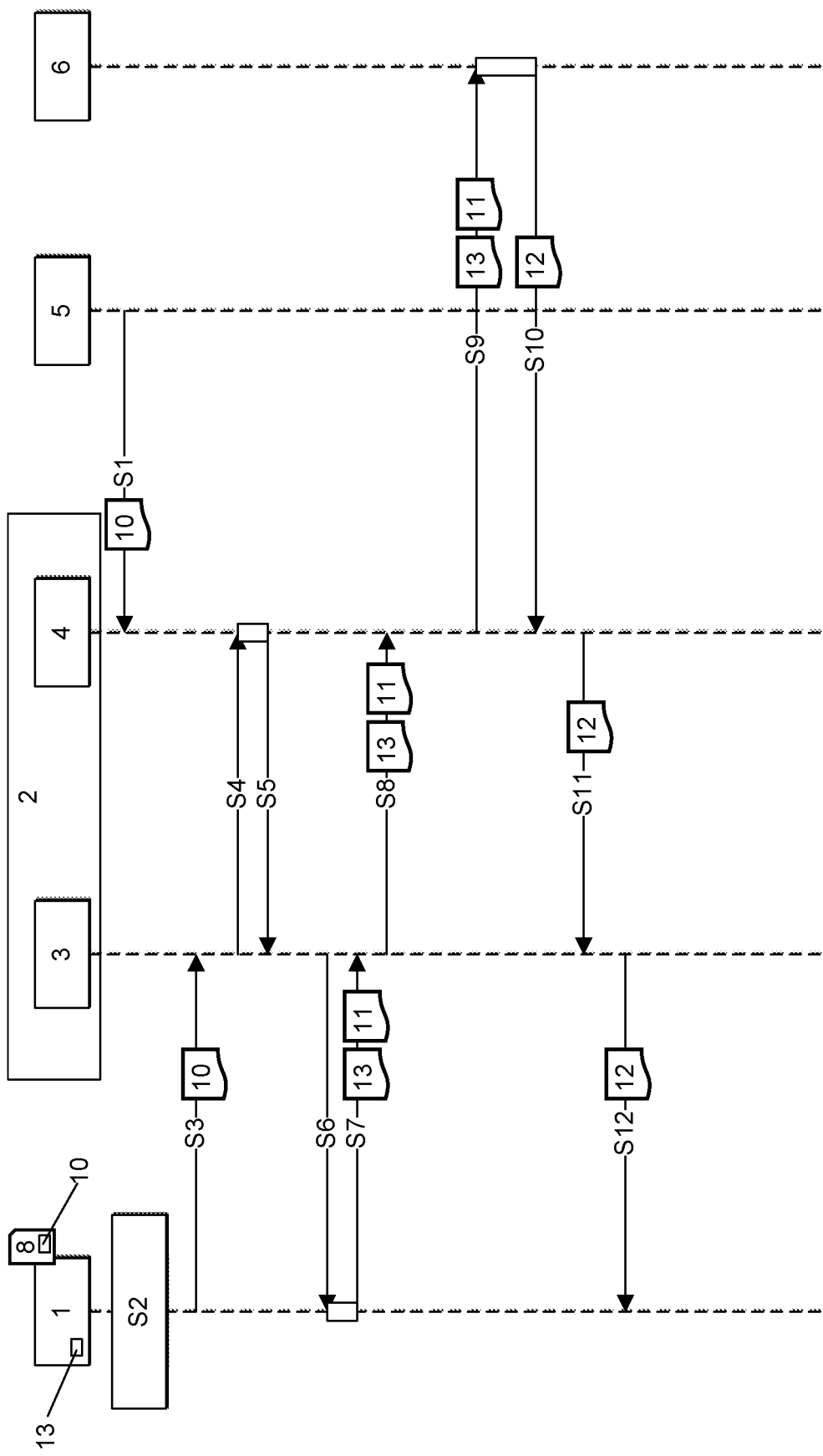
FIG. 1 shows a sequence diagram of the message flow according to a first embodiment of the invention.

The cellular network 2, resp. the HSS 4 is communicatively coupled to a central server 6 run by a M2M service provider.

The user equipment 1 in this exemplifying embodiment is an IoT device configured for regularly transmitting data to the central server, in particular measurement data of a smart-meter. This is configured to carry out a polling, which means in regular intervals a small amount of data are supposed to be transmitted to the central server. Further a response indicating if the data are safe and sound arrived at the central server is expected. Apart from polling also alarm may be transmitted by this mechanism.

The transmitted data in this exemplifying embodiment represent kilowatt hours consumed by the monitored building since the last data transmission.

The user equipment further comprises the credential container 8, containing at least one preconfigured qualifier 10.

The manufacturer 5 of the credential container 8 registers said preconfigured qualifier 10 with message S1 at the HSS 4.

With step S2 the user equipment 1 is powered on and tries to camp on a base station of the cellular network 2. Preferably it also retrieves the preconfigured qualifier 10 from the connected credential container 8.

When the user equipment 1 figures out, e.g. by a timer, that it is time to transmit the latest measurements to the central server, it starts the process with the attach message S3 to the MME. This attach message comprises the preconfigured qualifier 10, which is in particular an ephemeral IMSI.

The MME 3 forwards the message and the preconfigured qualifier 10 as part of a authentication information request (AIR) message S4 to the HSS 4. The HSS responds with an Authentication Information Answer (AIA) S5 and instructs the MME 3 to provide an authentication request message S6, comprising at least a random value and an authentication code, known as RAND/AUTN values, to the user equipment 1.

This message is originally supposed to authenticate the cellular network with the authentication code AUTN and to instruct the user equipment to provide a response based on the RAND value, in order to have the cellular network determining if the user equipment is eligible for accessing the cellular network.

Instead of doing the latter the user equipment responds with an authentication failure message S7. This is for indicating a synchronization failure and allows to provide an AUTS field and 14 bytes of additional data. The AUTS field is created in particular from a preconfigured identifier 13, e.g. an IMSI, MSISDN, ICCD or the like, stored in the user equipment or the credential container.

The user equipment further adds the payload item 11 to the authentication failure message S7 as part of the additional data field, and transmits the message to the MME 3, which forwards the retrieved data with AIR message S8 to the HSS. The payload item 11 is basically the result of the latest measurements.

The HSS 4 determines from the retrieved message S8 that the user equipment not (only) indicated a synchronization failure, but further provided a payload item 11 and a preconfigured identifier 13. Hence it checks if the central server 6 is assigned to the user equipment, identified by the preconfigured identifier 13. This may happen internally or by means with a special request to the central servers connected to the cellular network (not displayed).

When this is the case, the HSS 4 sends an API request message S9 to the central server, comprising at least the preconfigured identifier 13 and the payload item 11. The API request message may be any type of message, e.g. IP based or following any standardized or proprietary protocol, agreed between cellular network operator and the service provider of the central server.

The central server then processes the received data. When they are accurate the payload data are stored locally, otherwise discarded. The central server therefore wants to inform the user equipment about the outcome of the check, hence send an ACK or NACK message to the user equipment.

This is done by responding to the API request message S9 with API response message S10 to the HSS, which comprises a response data item 12. The response data item comprises at least the ACK or NACK status of the mentioned server check.

The HSS forwards the retrieved response data item by way of a AIA message S11 to the MME 3.

The MME then sends via its serving base station a second authentication request message S12 to the user equipment, wherein the response data item is also coded, as part of the AUTS message. The user equipment expects after the authentication failure message to retrieve a second authentication request message, in the sense of a retry mechanism. This second authentication request message S12 is used here for sending the response data from the central server to the user equipment. By support of the credential container 8 the user equipment retrieves the provided response data item.

Depending upon the received response data content, the user equipment 1 behaves accordingly, that means either retries or discards the transmitted data.

As the next data transmission is due in 24 hours, the user equipment 1 does not need to continue the attach procedure. Preferably it sends authentication response with inaccurate data, and the cellular network will reject the attach procedure, which is then terminated.

Figure 2:
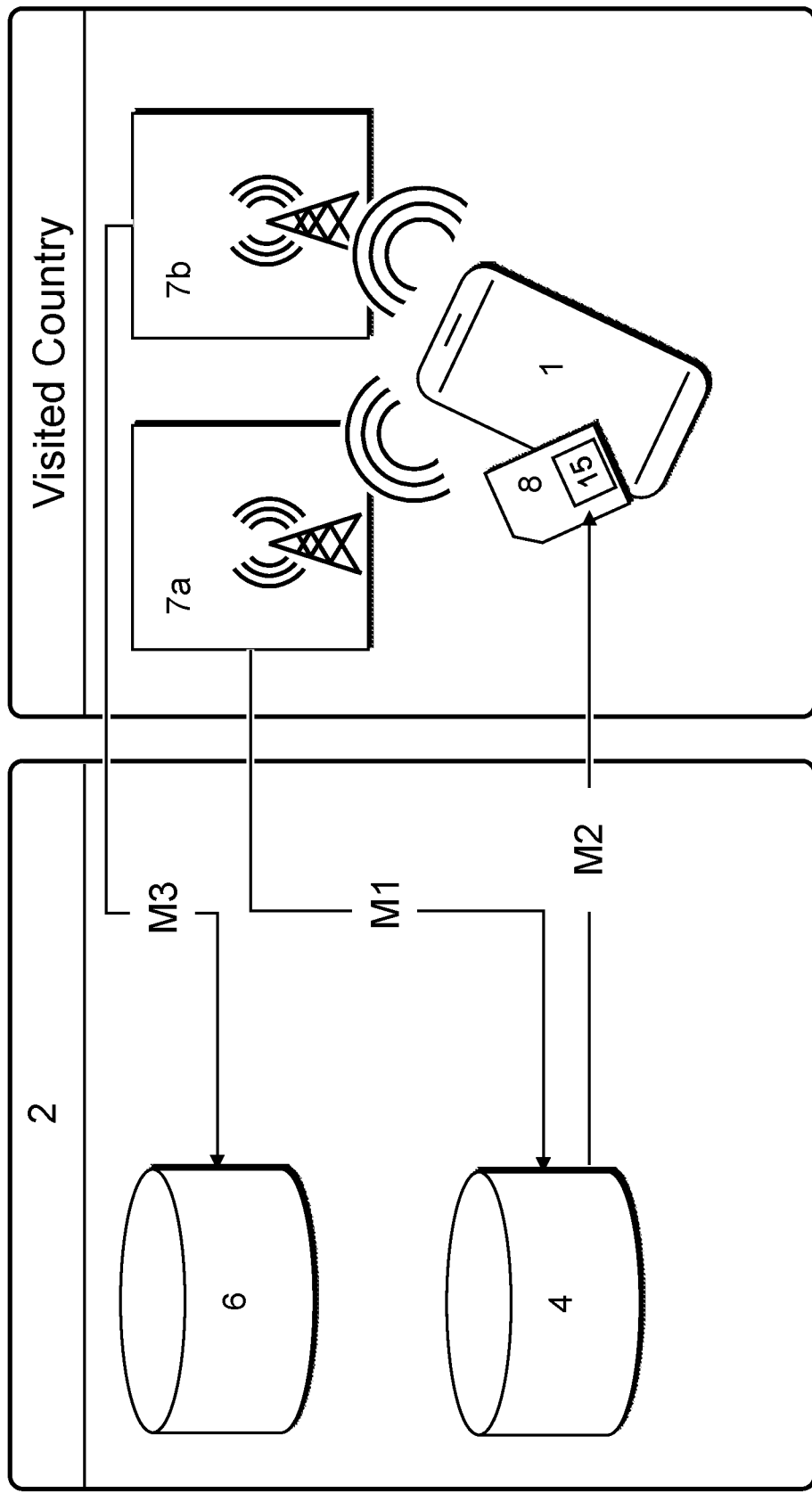
FIG. 2 represents a user equipment of the type to which the present invention is applied as an embodiment in conjunction with a cellular network according to an embodiment of the invention.

FIG. 2 shows the situation of a user equipment 1 operating in a visited country, that means a country, where its home cellular network 2 is not available.

The user equipment 1 is equipped with a credential container 8, that is in particular an UICC. When switched on the user equipment 1 finds two cellular networks 7a and 7b, which could serve as visited cellular network for the user equipment.

The credential container 8 has stored a preferred PLMN list 15. In a normal situation the user equipment receives from the broadcast of the available cellular networks 7a, 7b their Mobile Network Code (MNC) and Mobile Country Code (MCC), and checks with the credential container 8, which of the cellular networks is listed in the PLMN list 15 as preferred for the Mobile Country Code.

When one of the found cellular networks 7a, 7b is found, then the user equipment will register there and try to attach, e.g. for sending polling data as shown in FIG. 1.

If not, the user equipment has no indication about a preferred visited cellular network. Hence it camps on one of the cellular networks 7a, which turns out not to be the one with the best roaming agreements with the home cellular network 2.

When operating in the cellular network 7a, it communicates via request M1 to the HSS 4 of the home cellular network 2, in particular in order to figure out if the user equipment requesting access is eligible for accessing the cellular network. Typically this happens once, and afterwards the achieved data are stored locally in the visited cellular network in the Visited Location Register (VLR).

The home cellular network 2, in particular the HSS is in response declined to send an update message M2 to the user equipment 1, for updating the PLMN list 15 of the credential container 8. This helps the user equipment to detach from cellular network 7a and switch to the cellular network 7b with the better roaming agreement, in other words the preferred visited cellular network.

By means of this attachment to the preferred visited cellular network the user equipment can consequently send under better conditions data messages M3 to a central server 6, without having to face high costs.

Figure 3:
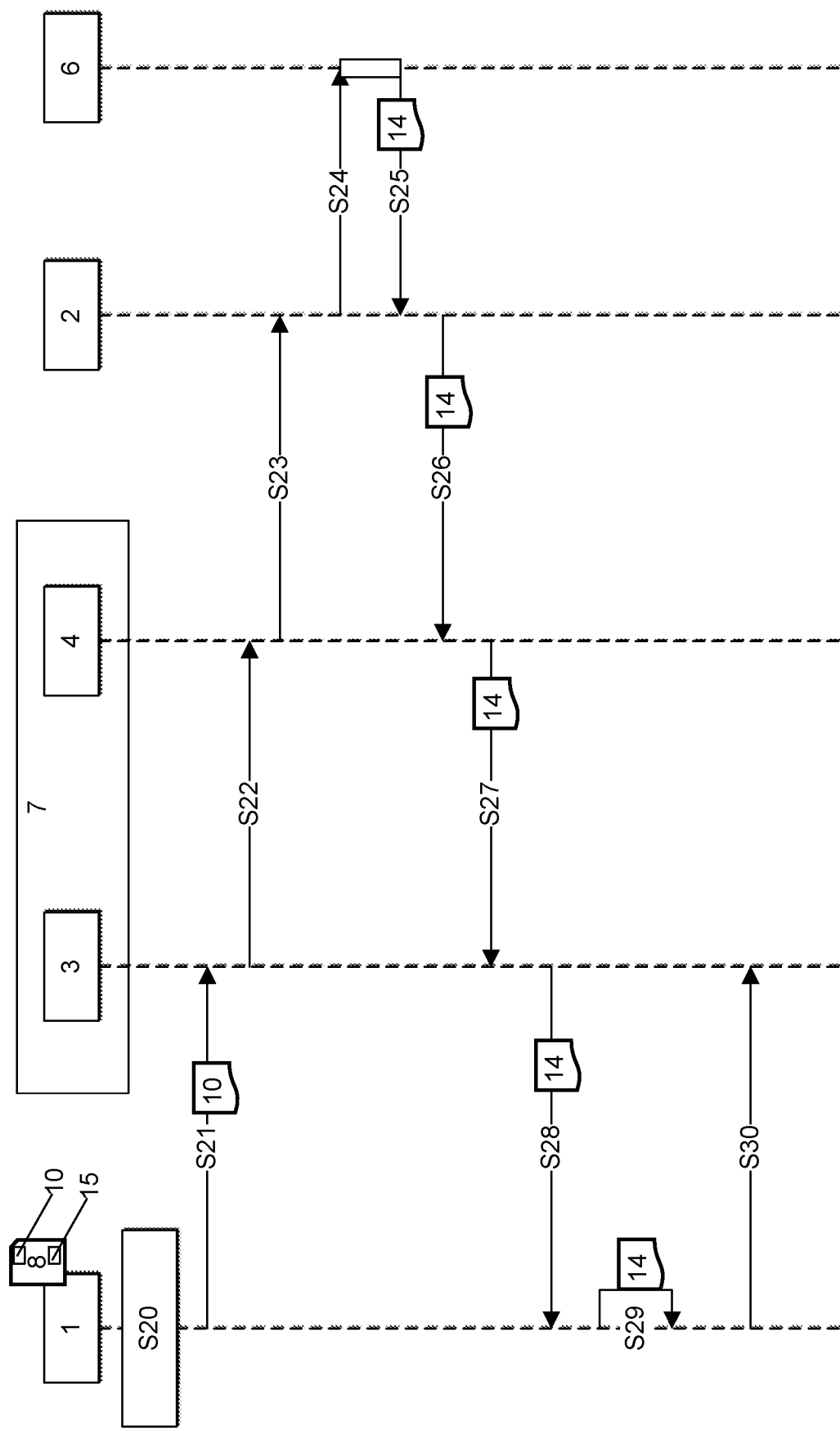
FIG. 3 displays a sequence diagram of the message flow according to a second embodiment of the invention.

How the update of the PLMN list with message M2 is carried out in detail is shown in FIG. 3. It shows a sequence diagram alike the one of FIG. 1, with the difference that user equipment 1 is camping in the visited cellular network 7, which is connectively coupled to the home cellular network 2. The home cellular network 2 is further coupled to a central server 6, in this case for managing the preferred visited cellular networks data. Preferably the HSS of the home cellular network will manage the communication with the central server.

In step S20 the user equipment is switched on and attempts to attach to the visited cellular network 7. This is carried out with attach request S21, to the MME 3 of the visited cellular network 7, providing a preconfigured qualifier 10 of the user equipment, in particular its permanent IMSI, stored in the credential container 8.

The attach request is forwarded by means of the Authentication Information Request (AIR) message S22 to the HSS 4 of the visited cellular network 7.

There it is determined, that the requesting user equipment is not a subscriber of this cellular network, but of home cellular network 2. Hence a further message S23 comprising the preconfigured qualifier is sent to the cellular network 2. For that standard inter-network messaging mechanisms are preferably used.

The home cellular network 2 then needs to evaluate if the user equipment 1 is currently trying to attach to the preferred visited cellular network of the respective country or region. For that it sends an API request S24 to the central server 6. Preferably this comprises at least an indication of the visited cellular network 7, in particular the MNC and preferably the MCC (not shown).

The central server 6 responds with a API response message S25 indicating in this exemplifying embodiment, that this is not the preferred visited cellular network of that country. Hence it provides with said API response message 25 an preferred network data item 14 indicating at least the better visited cellular network. In the simplest embodiment the response comprises the MNC of the preferred visited cellular network. More or enhanced data items are possible.

The cellular network 2 hence forwards the received preferred network data item with a response message S26 to the HSS 4 of the visited cellular network 7.

The HSS 4 consequently instructs with AIA message S27 the MME to send an authentication request message S28 enhanced with the provided preferred network data item 14.

The user equipment evaluates the retrieved authentication request message. In case it contains the preferred network data item 14, it carries out in step S29 the update of the PLMN list 15 stored in the credential container 8.

Further it changes with message S30 the visited cellular network to the one corresponding to the received preferred network data item 14. Consequently the user equipment now can attach to the preferred visited cellular network and send data, e.g. by means of the process described in FIG. 1, or by means of a regular data connection.

In the above detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The above detailed description is, therefore, not to be taken in a limiting sense, and the scope of the present invention is defined only by the appended claims, appropriately interpreted, along with the full range of equivalents to which the claims are entitled.

What is claimed, is:

1. A Central server for communicating with a user equipment through at least one cellular network, being communicatively coupled with said at least one cellular network,
    said central server being configured to exchange with said at least one cellular network information relating to at least one preconfigured qualifier assigned to at least one user equipment being assigned to the central server, and
    to receive a payload item from said cellular network transmitted by said user equipment to said cellular network by means of an authentication failure message for authenticating a user equipment at a cellular network during an attach process,
    wherein the authentication failure message comprises the payload item;
    wherein said payload item is the result of a measurement of a sensor connectively coupled to the user equipment when operating as an Internet of Things (IoT) smart-metering device.

2. The server of claim 1, wherein said payload item results from a latest measurement data of said user equipment operating as an Internet of Things (IoT) device regularly transmitting data to said central server.

3. The server of claim 2, wherein said payload item is the result of a measurement of consumed electricity of the last 24 hours.

4. The server of claim 1, wherein the attach process is started by the user equipment with an attach request message and synchronized to a base station to receive the attach request message, wherein a parameter of the attach request message is a preconfigured qualifier indicative of a subscription of the user equipment.

5. The server of claim 4, wherein the preconfigured qualifier is a permanent identifier either an IMSI or MSISDN.

6. The server of claim 4, wherein said communicating is managed by a Home Subscriber Server (HSS) assigned to check a status of subscription of camping base stations.

7. The Central server according to claim 1, further configured in response to receiving said payload item, to submit a response data item to the cellular network for submitting to the user equipment by means of a second authentication request message.

8. The Central server according to claim 1, further configured to store data relating to at least one preferred visited cellular network, and to provide at least one set of data relating to said preferred visited cellular networks to said communicatively coupled cellular network.

9. The Central server according to claim 1, provides for subscriptions of smart meter services to said user equipment.

10. A Central server for communicating with a user equipment via a common Internet Protocol (IP) address through at least one cellular network, being communicatively coupled with said at least one cellular network by means of a Packet Data Network Gateway (PDN-GW) via Internet,
    said central server being configured to provide an interface for a service provider on said at least one cellular network and exchange information relating to at least one preconfigured qualifier assigned to at least one user equipment being assigned to the central server, and
    to receive a payload item from said cellular network transmitted by said user equipment to said cellular network responsive to a measurement result by means of an authentication failure message to communicate smart-metered data to said service provider,
    for authenticating said user equipment on said cellular network during an attach process started by the user equipment comprising the payload item for cost optimizations;
    wherein said payload item is the result of a measurement of a sensor connectively coupled to the user equipment when operating as an Internet of Things (IoT) smart-metering device.

11. The server of claim 10, wherein said payload item results from a latest measurement data of said user equipment operating as an Internet of Things (IoT) device regularly transmitting data to said central server.

12. The server of claim 1, wherein the attach process is started by the user equipment with an attach request message and synchronized to a base station to receive the attach request message,
    wherein a parameter of the attach request message is a preconfigured qualifier indicative of a subscription of the user equipment,
    wherein the preconfigured qualifier is a permanent identifier either an IMSI or MSISDN.

13. The server of claim 1, wherein the authentication failure message is sent instead of receiving a SMS.

14. The server of claim 1, wherein the authentication failure message is sent instead of establishing an IP connection with said user equipment.

* * * * *